United States Patent
Pleskot

(10) Patent No.: US 8,911,022 B2
(45) Date of Patent: Dec. 16, 2014

(54) FASTENING SYSTEM, COVERING APPARATUS, SEATING DEVICE, AND VEHICLE

(75) Inventor: Andrzej Pleskot, Seeheim-Jugenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 172 days.

(21) Appl. No.: 13/588,723

(22) Filed: Aug. 17, 2012

(65) Prior Publication Data

US 2013/0043710 A1     Feb. 21, 2013

(30) Foreign Application Priority Data

Aug. 19, 2011 (DE) .................. 10 2011 110 678

(51) Int. Cl.
*A47C 31/00*     (2006.01)
*B60N 2/58*     (2006.01)

(52) U.S. Cl.
CPC .................. *B60N 2/5825* (2013.01)
USPC .................. 297/452.59; 297/218.3

(58) Field of Classification Search
CPC .. A47C 31/023; A47C 31/026; B60N 2/5816; B60N 2/5825; B60N 2/5833
USPC ............ 297/218.3, 218.5, 452.58, 452.59, 297/463.1
See application file for complete search history.

(56) References Cited

U.S. PATENT DOCUMENTS

| | | | | |
|---|---|---|---|---|
| 1,940,636 A | * | 12/1933 | Stubnitz ................ | 29/91.1 |
| 3,981,534 A | * | 9/1976 | Wilton .................. | 297/218.1 |
| 4,789,201 A | | 12/1988 | Selbert | |
| 5,015,034 A | * | 5/1991 | Kindig et al. ........... | 297/227 |
| 5,121,963 A | | 6/1992 | Kwasnik et al. | |
| 5,560,677 A | * | 10/1996 | Cykana et al. .......... | 297/218.3 |
| 5,820,213 A | * | 10/1998 | Severinski ............. | 297/218.5 |
| 5,879,051 A | | 3/1999 | Cozzani | |
| 5,971,478 A | * | 10/1999 | Hurite .................. | 297/218.3 |
| 6,378,949 B1 | | 4/2002 | Maeda et al. | |
| 6,543,843 B1 | | 4/2003 | Moilanen | |
| 6,612,648 B1 | * | 9/2003 | Hashiguchi ............. | 297/218.1 |
| 6,745,444 B2 | * | 6/2004 | Moilanen .............. | 29/91.1 |
| 6,899,398 B2 | | 5/2005 | Coffield | |
| 6,942,300 B2 | | 9/2005 | Numa et al. | |
| 7,891,735 B2 | * | 2/2011 | Oku ..................... | 297/218.3 |
| 2005/0168039 A1 | | 8/2005 | Matsushita | |

FOREIGN PATENT DOCUMENTS

| | | |
|---|---|---|
| DE | 3535353 A1 | 4/1986 |
| DE | 8604745 U1 | 4/1986 |
| EP | 1136314 A1 | 9/2001 |
| EP | 2095746 A1 | 9/2009 |

(Continued)

OTHER PUBLICATIONS

Search Report dated Nov. 12, 2012 in GB 1213245.2.

*Primary Examiner* — Philip Gabler

(74) *Attorney, Agent, or Firm* — Ingrassia Fisher & Lorenz, P.C.

(57) ABSTRACT

A fastening system for fastening a covering apparatus to a support structure is provided. The fastening system comprises a support frame having a fastening edge configured as a beading and a fastening device for fastening the covering apparatus on the support frame. The fastening device has a fastening opening into which a fastening unit projecting from the support frame engages at least partially so that a fastening fixed in at least six degrees of freedom is ensured.

12 Claims, 2 Drawing Sheets

(56) References Cited

FOREIGN PATENT DOCUMENTS

| | | | |
|---|---|---|---|
| FR | 2686553 | A1 | 7/1993 |
| FR | 2707147 | A1 | 1/1995 |
| FR | 2821029 | A1 | 8/2002 |
| FR | 2908122 | A1 | 5/2008 |
| JP | 10071916 | A | 3/1998 |
| JP | 2003024187 | A | 1/2003 |
| JP | 2010173387 | A | 8/2010 |

* cited by examiner

FASTENING SYSTEM, COVERING APPARATUS, SEATING DEVICE, AND VEHICLE

CROSS-REFERENCE TO RELATED APPLICATION

This application claims priority to German Patent Application No. 10 2011 110 678.6, filed Aug. 19, 2011, which is incorporated herein by reference in its entirety.

TECHNICAL FIELD

The technical field relates to a fastening system for fastening a covering apparatus to a support structure, in particular for fastening a seat cover to a vehicle seat.

The technical field further relates to a covering apparatus for a support structure, in particular for a seat structure of a vehicle seat.

The technical field also relates to a seating device, in particular for a vehicle seat.

In addition, the technical field relates to a vehicle comprising a vehicle seat.

BACKGROUND

Covers for stretching onto support structures, for example, a material cover for stretching onto a seat structure in a vehicle, are generally known. A hook portion is attached to the outer edge of the cover for fastening the cover to the support structure. When pulling the cover onto the support structure, this hook portion is hooked behind or into the trimmed edge of the support structure. In order to obtain a fold-free cover, a relatively high cover tension is required. This is achieved by manufacturing the cover to be extremely skimpy in relation to an upholstery of the support structure. As a result, however, when pulling the cover onto the support structure, a high cover stress is obtained, which leads to a high action of force perpendicular to the cross-section of the hook portion. This force further loads on the support structure, for example, due to a person sitting on the support structure and/or high temperatures, can have the result that the hook portion slips from the trimmed edge of the support structure. In addition, this type of fastening is only suitable for support structures made of a metal since a high stability of the trimmed edge is required here.

U.S. Pat. No. 4,789,201 describes a vehicle seating device comprising a support frame having a plurality of elongated slots of predetermined width and a seat cover, where a fastening strip of extruded plastic is sewn on the seat cover. The fastening strip comprises a base body, a flange body which is sewn to the seat cover, and a plurality of hook portions projecting in pairs from the base body. The hook portions are inserted into slots in the supporting frame in order to fasten the seat cover to the supporting frame. In order to prevent detachment of the hook portions, these are configured with barbs. However, this fastening of the seat cover is accordingly not designed to be detachable. Nevertheless, the loading capacity of the fastening of the hook portions is too low in order to ensure a secure fastening of the seat cover.

It is at least one object herein to improve a fastening system for a cover on a support structure in such a manner that this on the one hand ensures secure stretching of the cover onto the supporting structure and on the other hand the manufacture of the system and the mounting on the support structure is simplified. It is furthermore an object to provide a suitable covering apparatus and a seating device and a vehicle for this purpose. In addition, other objects, desirable features and characteristics will become apparent from the subsequent summary and detailed description, and the appended claims, taken in conjunction with the accompanying drawings and this background.

SUMMARY

In accordance with an exemplary embodiment, a fastening system for fastening a covering apparatus such as a seat cover to a support structure such as a vehicle seat is provided. The fastening system comprises a support frame having a fastening edge configured as a beading and a fastening device for fastening the covering apparatus on the support frame. The fastening device has a fastening opening into which a fastening unit projecting from the support frame engages at least partially so that a fastening fixed in at least six degrees of freedom is ensured.

A substantially secure fastening is ensured with such a fastening of a cover unit to a support structure since the fastening withstands a higher cover stress compared with hitherto known solutions. For example, this fastening is also secure even at high cover stresses or a loading in various directions and at very high temperatures. In these cases, the fastening device advantageously remains secure on the support structure. Accordingly, in one embodiment, the fastening system ensures a fastening of the fastening device on the support frame which is fixed in at least six degrees of freedom. This is achieved by the partial enclosure of the beading and also by the partial engagement in the fastening opening. The degrees of freedom comprise both translational and rotational degrees of freedom.

In an embodiment, the support frame comprises a frame opening, for example in a region in which the fastening unit projects from the support frame. The fastening unit is preferably configured as a resilient part projecting obliquely from the support frame. In the assembled state, the fastening unit projects into the fastening opening or passes through the fastening opening. The fastening unit thereby contacts the fastening device so that the fastening device rests on the fastening unit. In this way, the fastening device is fixed in one direction at least in relation to the support frame.

The support frame advantageously has a fastening edge designed as a beading. Beading as used herein is defined broadly so that any bending, folding or deflections should is contemplated hereunder. Generally one edge of the support frame is bent so that a U or V shape of the edge cross section is formed. The support frame is one-part in one embodiment, multipart in another embodiment, for example, is two- or three-part. To this end, the support frame advantageously peripherally comprises a circumferentially or sectionally configured fastening edge. The material termination of the support frame or the edge thereof is understood as the fastening edge. The fastening edge is configured as a beading, bend, and/or folded edge. In one embodiment, the frame opening is formed in the area of the fastening edge, for example in the non-bent section.

In one embodiment, at least two fastening devices are implemented. In another embodiment a plurality of fastening devices are implemented. Preferably however a multiplicity of fastening devices is implemented. For fastening the fastening device on the support frame, this encloses the fastening edge at least partially.

The fastening devices are, for example, made of plastic. These fastening devices made of plastic can, for example, by produced by means of extrusion processes. The fastening devices in their raw form are preferably present as an endless part, which is then cut into appropriate lengths as required. Such manufacture is particularly flexible.

According to an embodiment, the fastening device comprises a fastening opening. In one embodiment, precisely one fastening opening is formed, in other embodiments more than one fastening opening, for example, two, three, four or more fastening openings are formed. The fastening openings are, for example, manufactured by means of a stamping process and/or a cutting process, in particular a water jet cutting process.

In one embodiment, precisely one frame opening and/or one fastening unit is formed, in other embodiments more than one frame opening and/or fastening unit, for example, two, three, four or more frame openings and/or fastening units are formed. The frame openings and/or the fastening unit of the support frame can advantageously be disposed arbitrarily along the support frame. Preferably a multiplicity of frame openings and/or fastening units is disposed spaced apart in the circumferential direction on the fastening edge. In further exemplary embodiments, the frame openings and/or fastening units are designed to be variable in their number and in particular in their length in the circumferential direction. The frame openings and/or fastening units are, for example, produced by a stamping process and/or a cutting process, in particular a water jet cutting process. The fastening unit is preferably configured as a broken-out or partially stamped-out section of the support frame so that during its manufacture the frame opening is formed as a result of the manufacture of the fastening unit. That is, the fastening unit is formed in one piece or integrated with the support frame.

For example, one fastening opening is formed per fastening unit. Alternatively, the fastening device has more than one fastening opening, for example, two or more fastening openings. Furthermore, according to an embodiment, at least one fastening unit is formed in the area of the frame opening in the support frame. In one embodiment, precisely one fastening unit, in other embodiments more than one fastening unit, for example, two or three fastening units, are formed. Advantageously, the fastening unit is integrated in the frame opening or in the support frame.

The fastening device is advantageously fastened in the area of a fastening unit on the fastening edge, that is the beading, of the support frame. Advantageously one fastening opening of the fastening device and one frame opening and/or one fastening unit of the support frame are disposed on one another or adjacent to one another in a fastened state. In this case, on the one hand the fastening unit engages at least partially in the fastening opening of the fastening device and on the other hand the fastening device encloses the beaded or bent edge of the seat structure in a clamp- or clip-like manner at least partially so that a force and/or form fit is achieved. Preferably a force and form fit is formed in order to ensure a particularly secure fastening. Due to the advantageous partial enclosure of the fastening edge and the engagement of the fastening unit in the fastening opening, a positive and/or nonpositive fastening is produced, which advantageously withstands a substantially higher action of force, for example, a cover stress than the fastenings known from the prior art. The force and/or form fit in this case enables a secure fastening in at least six degrees of freedom, that is along the support frame in two direction and in four directions transverse to this. Furthermore, the fastening is also secured against a rotational movement of the fastening device.

In an embodiment of the fastening system, the fastening opening is configured as a material opening. Material opening is understood herein as a through opening in the material of the support frame or of the fastening device. Preferably the frame opening and/or the fastening opening are designed as material opening. Accordingly, these material openings are advantageously formed on the support frame or in the fastening device. In one embodiment the material openings are slot-shaped. Preferably the material openings are elongated, in particular rectangular, for example, as a continuous, broken-through groove or elongate hole. In one embodiment the material openings are designed with a tapering cross-section.

Between the material opening on the support frame and a material edge of the support frame, the beaded fastening edge advantageously remains as a material web. In one embodiment, this material web or the beading of the fastening edge is partially, preferably completely enclosed by the fastening device. Advantageously the fastening device engages at least partially in the beading, preferably in the area of the fastening edge. Thus, the fastening edge is preferably held both positively and nonpositively by the fastening device. In one embodiment precisely one complementary fastening device is provided for each fastening opening. In another embodiment, a plurality of, for example, two fastening units, are provided for each fastening device.

In an embodiment, for engaging or partially enclosing the fastening device in or around the support frame, the fastening device has a hook-like section at its end. This hook-like section surrounds the end of the support frame so that this is fixed in a plurality of directions by the hook-like element. The fastening device is preferably configured in such a manner that this nestles against the contour of the bent frame end so that a connection in the manner of a beading is given.

In another embodiment, the fastening unit of the support frame is configured as a folded edge in the area of the frame opening. The size of the folded edge can correspond to the size of the frame opening. The folded edge of the fastening unit is preferably integrated in the frame opening. For example, the folded fastening unit is formed by folding the material of the material opening of the frame opening. In this case, the fastening unit is, for example configured as a tab. During fastening of the fastening device, the fastening unit of the support frame engages at least partially in the fastening opening of the fastening device. A positive and/or nonpositive fastening is thereby achieved. Alternatively or additionally, the fastening unit is configured as a stamped part which is connected on one side to the support frame whereas the other sides are released from the support frame.

In a further embodiment the frame opening and/or the fastening opening are designed as a material recess. This material recess does not break through the material of the support frame unlike a material opening. This is therefore not a through opening but a formation in the material. To this end, in one embodiment the fastening opening has an undercut or the like so that the fastening unit engages there.

In yet another embodiment, the fastening device is configured as a clip-shaped fastening element. This clip-shaped fastening element encloses the support frame at least partially. A clip-shaped element is understood as a spring-elastic clip which enables a clipping or clamping fastening through its spring action. By a clip-shaped fastening element, the enclosing of the beading of the support frame or the end of the support frame and the engagement can be executed particularly advantageously.

In this regard, in an embodiment, the clip-shaped fastening element has a substantially J-shaped cross-section. In this case, a lug projecting transversely thereto is located at one end, preferably a shorter leg. In one embodiment, the legs are different lengths, in another embodiment they are the same length. Accordingly, when the legs are the same length, the lug does not extend beyond the second leg. If the legs are different lengths and if the lug is attached to the longer of the legs, the length of the lug can be selected arbitrarily. In one embodiment, the beading of the support frame is enclosed by the legs and the lug or rounding of the J. Overall the fastening element can therefore be clipped on. In so doing, a positive and/or nonpositive fastening is obtained. The clippable connection between fastening device and support frame is advantageously irreversible, that is, nondetachable. In particular, the clippable connection is designed to be detachable only with the aid of a tool. It is further advantageous that when clipping the fastening element around the fastening edge an audible signal is produced so that it is signaled when the connection is securely engaged, for example, in the form of a snap-in noise. The connection is further advantageously designed to be detachable. As a result the fastening of the covering unit is particularly secure against actions of forces and still flexible, for example, for exchanging the covering unit.

In a further embodiment, the first fastening opening and/or the second fastening opening is designed to be undercut-free. By this means working steps in the manufacture of the support frame of the fastening system are advantageously saved.

In accordance with an exemplary embodiment, in a covering apparatus for a support structure, in particular for a seat structure of a vehicle seat, comprising a covering unit for at least partially spanning the support structure and a fastening device, the fastening device is configured to be integrated in the covering unit. In one embodiment the covering unit is one-part, in another embodiment, multipart. For example the covering unit is formed from a material comprising natural fibers and/or synthetic fibers. Advantageously the covering unit is made of a tear resistant material since when stretching the covering unit onto the support structure a high cover stress is exerted. In one embodiment, the covering unit comprises elastic elements which afford an improved adaptation for stretching on.

In an embodiment, the fastening device is integrated in the covering unit. Advantageously the fastening devices are integrated in an edge zone along the circumference of the covering unit into the unit. For example, the fastening devices are sewn into the covering unit and/or welded to the unit and/or adhesively bonded. The connections between the fastening devices and the covering unit are advantageously tear resistant, that is, capable of being loaded with high cover stress.

The fastening devices can be disposed arbitrarily on a circumference of the covering unit, where both the distances between the individual fastening devices can be selected arbitrarily and also a length - in the circumferential direction - of the individual fastening devices. Here it is further advantageous to adapt the positions of the fastening devices to the positions of the first fastening openings in the support structure. The fastening opening is designed to be longer in its length than a fastening device so that a clearance is provided here when hooking the fastening unit into the fastening opening of the fastening device.

In one embodiment the support structure is one-part, in another embodiment, multipart. The support structure is for example formed from a metal such as steel and/or from a nonmetal material such as plastic, or magnesium or alloys or compounds thereof In one embodiment two fastening units and/or frame openings are formed on the support structure, preferably opposite, diagonally, or transversely. In another embodiment, a plurality of fastening units and/or frame openings is formed, where the number of fastening units and/or frame openings in one embodiment corresponds to the number of the fastening devices. The fastening units and/or frame openings can be introduced into the material of the support structure, for example, by lasers, stamping, embossing, cutting, and/or sawing. The same applies also for the fastening openings of the fastening device.

It is furthermore advantageous that the fastening units and/or frame openings are disposed along the circumference of the support structure close to the beaded fastening edge, i.e., the edge of the support frame. Their precise position and their width are arbitrary in this case or can be matched to the position and width of the fastening devices on the covering unit. The positions can advantageously be adapted to changes in course of the fastening edge. Executing the fastening unit and/or frame opening as a material opening, one the one hand ensures enclosure of the beading by the fastening devices and on the other hand it is possible for the fastening unit to engage in the fastening opening of the fastening device. Both a nonpositive and positive connection is thus ensured.

In addition, in an embodiment, in a seating device, in particular for a vehicle, at least comprising a seat structure, a seat upholstery, and a cover, the seat structure is configured as a support structure described previously and/or the cover is configured as a covering apparatus described previously. In particular the support or seat structure comprises a seat shell and a seat rest. The previously described fastening of the cover on the structure can be implemented both on the seat shell and also on the seat rest. In one embodiment the seating device is designed as a single seat, in another embodiment as a bench seat.

In another embodiment, in a vehicle at least comprising at least one vehicle seat, the vehicle seat is configured as a seating device described previously. The vehicle can be designed for example as an automobile, truck, omnibus, aircraft, train etc. In one embodiment the vehicle comprises at least two individual seats and a bench seat disposed therebehind.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof Furthermore, there is no intention to be bound by any theory presented in the preceding background or the following detailed description.

Figure 1:
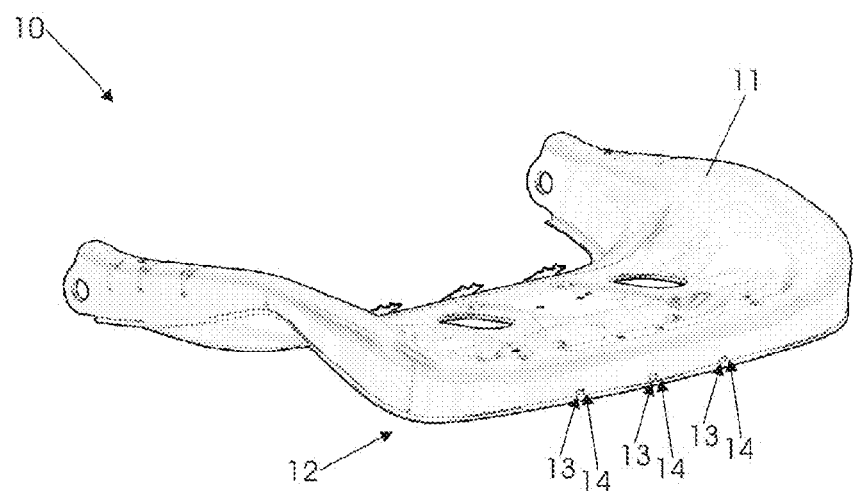
FIG. 1 shows a schematic perspective view of a part of a seat structure in accordance with an exemplary embodiment.

FIG. 1 shows a schematic perspective view of a seat structure 10. The seat structure 10 comprises a seat shell 11, which is only shown in part here. For the sake of clarity, the other components of the seat structure 10 are not shown here. The seat shell 11 comprises a circumferential fastening edge 12 with three frame openings 13 and three fastening units (not shown here) in a frontal region. In this embodiment, the fastening edge 12 is designed as beading. The three frame openings 13 and the three fastening units are disposed in a front region of the seat shell 11 in a spaced-apart or distributed manner. In the embodiment of FIG. 1, the frame openings 13 are each formed as a material opening in the form of a rectangular, elongated slot. Accordingly, the fastening units resulting from the production of the frame opening 13 are configured approximately in the form of a rectangular elongated folded edge or tab, approximately complementary to the respective frame opening 13. The length of a frame opening 13 and/or a fastening unit—in the circumferential direction of the fastening edge 12—is dependent on the material of the seat shell 11. For example, the seat shell 11 is formed from a material comprising metal or magnesium. The frame openings 13 each have a fastening unit 14 (see FIG. 2). The frame openings 13 with the fastening units 14 are used for stretching on or hooking on a seat cover, also not shown here, where the fastening devices are on the one hand clipped around the fastening edge 12 and on the other hand the fastening units 14 of the seat shell 11 engage in the fastening devices 1 (see FIGS. 4 and 5).

Figure 2:
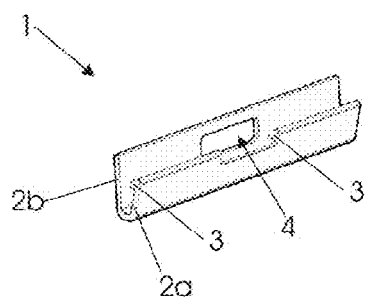
FIG. 2 shows a schematic perspective of the fastening device in accordance with an exemplary embodiment.

FIG. 2 shows a schematic perspective view of the fastening device 1 in accordance with an exemplary embodiment. The fastening device 1 is designed as a one-part, clip-shaped fastening element having an approximately J-shaped cross section (see also FIGS. 4 and 5). The J-shaped cross section is formed by two different length interconnected legs 2a and 2b and a lug 3 gripping around the fastening edge. The two legs 2a and 2b are interconnected and thus form a U-shape or as a result of the different lengths of the legs 2a and 2b, a J shape. The lug 3 is disposed on the first, shorter leg 2a, where the lug 3 projects in the direction of the other longer leg 2b. In this embodiment the second leg 2b with the lug 3 is interrupted or taken out in the area of the fastening opening 4 disposed on the first leg 2a. The fastening opening 4 is formed on the first leg 2a. According to FIG. 2, the fastening opening 4 is designed as an elongated, slot-shaped material opening.

Figure 3:
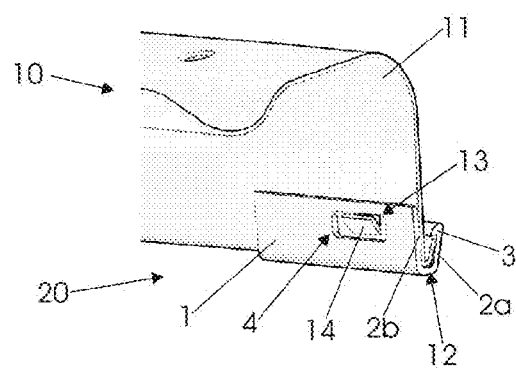
FIG. 3 shows a schematic perspective view of a section of a fastening system in accordance with an exemplary embodiment.

FIG. 3 shows a schematic perspective view of a section of a fastening system 20 in accordance with an exemplary embodiment. The fastening system 20 comprises the seat shell 11 of the seat structure 10 according to the embodiment of FIG. 1 with clipped-on fastening device 1 according to FIG. 2. The fastening device 1 is clipped around the fastening edge 12 formed as beading or bend. The width of the fastening opening 4 according to FIG. 2 approximately corresponds to the width of the fastening unit 14. In addition, the fastening unit 14 engages in the fastening opening 4 (see FIGS. 4 and 5) and passes partially through this.

Figure 4:
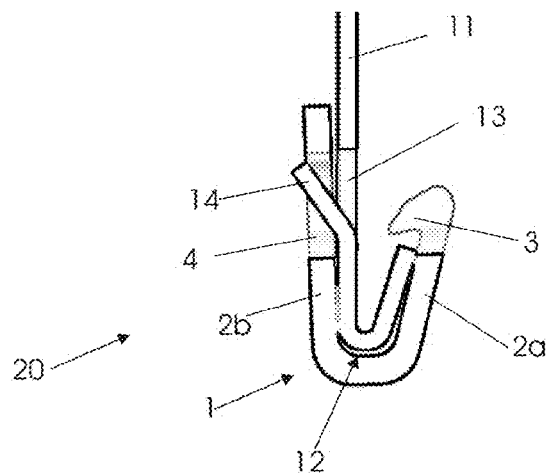
FIG. 4 shows an enlarged cross section through the fastening system according to FIG. 3.

FIG. 4 shows an enlarged cross section through the fastening system 20 according to FIG. 3. The seat shell 11 and the fastening device 1 correspond to the embodiments shown in FIGS. 1 to 3. The same components are identified with the same reference numbers. A detailed description of components already described is therefore dispensed with. The fastening edge 12 is enclosed by the legs 2 on both sides and the hook-shaped lug 3 of the fastening device 1 partially embraces the fastening edge 12 at its outer end. The clip connection thus made is configured to be positive and/or nonpositive and detachable. The fastening opening 4 is formed in the leg 2 without lug 3. The tab-like fastening unit 14 engages in the fastening opening 4 and thus provides for an additional stability and/or fixing of the fastening device 1 in relation to the support frame. This fastening system 20 prevents any unintentional detaching of the fastening device 1 in the direction of several degrees of freedom, i.e., all translational and rotational degrees of freedom. The lug 3 prevents slipping of the fastening device 1 downward while the fastening unit 14 prevents pulling away in the opposite direction, i.e., upward. At the same time, detachment in the transverse direction is prevented by the almost complete enclosure of the beading and by the engagement of the fastening unit 14 in the fastening opening 4. In addition, the fastening also prevents detachment as a result of rotation movements, for example twisting of the fastening device 1.

Figure 5:
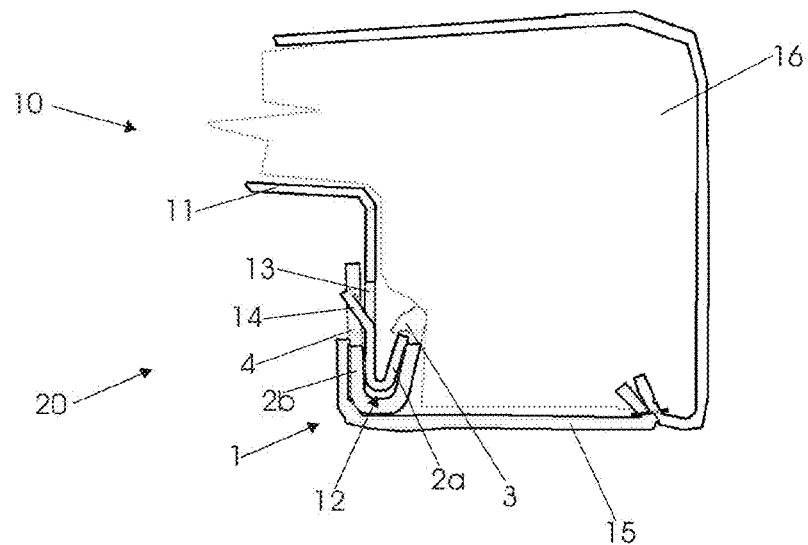
FIG. 5 shows another enlarged cross section through a section of the fastening system according to FIG. 3 showing a partial view of a vehicle seat.

FIG. 5 shows another enlarged cross section through a section of the fastening system according to FIG. 3 or 4 showing a partial view of a vehicle seat. The cross sectional view of the fastening system 20 corresponds to those of FIG. 3 or 4. A detailed description is therefore dispensed with. In addition, in FIG. 5 the fastening device 1 is connected to a covering unit 15. The covering unit 15 is stretched over a seat upholstery 16 of the vehicle seat of which only a section is shown. In the embodiment of FIG. 5 the covering unit 15 is at least two part. The two parts of the covering unit are interconnected by suitable connecting means.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A fastening system for fastening a covering apparatus to a seat structure, the fastening system comprising:
a seat shell of the seat structure, the seat shell comprising:
a fastening edge configured as a beading, and a fastening unit that projects from the seat shell; and
a fastening device for fastening the covering apparatus on the seat shell, wherein the fastening edge of the seat shell is inserted into the fastening device such that the fastening device at least partially encloses the fastening edge, the fastening device comprising:
a first leg having a lug at one end of the first leg; and
a second leg having a fastening opening therein, wherein the fastening edge is inserted into the fastening device between the first leg and the second leg, wherein the fastening unit that projects from the seat shell engages at least partially in the fastening opening so that fastening of the covering apparatus on the seat shell is fixed in at least six degrees of freedom.

2. The fastening system according to claim 1 wherein the covering apparatus is a seat cover of a vehicle seat.

3. The fastening system according to claim 1, wherein the fastening opening is configured as a material opening.

4. The fastening system according to claim 1, wherein the fastening unit of the seat shell is configured as a folded edge.

5. The fastening system according to claim 1, wherein the fastening device is configured as a clip-shaped fastening element which encloses the seat shell at least partially.

6. The fastening system according to claim 5, wherein the clip-shaped fastening element has a substantially J-shaped cross-section.

7. A covering apparatus for a seat structure that comprises a seat shell having a fastening edge and a fastening unit that projects from the seat shell, the covering apparatus comprising:

a covering unit for at least partially spanning the seat structure; and a fastening device that is configured to receive the fastening edge such that the fastening device at least partially encloses the fastening edge, wherein the fastening device is configured to be integrated in the covering unit, and wherein the fastening device comprises:

a first leg having a lug at one end of the first leg; and a second leg having a fastening opening therein into which the fastening unit that projects from the seat shell engages at least partially so that fastening of the covering apparatus on the seat shell is fixed in at least six degrees of freedom.

8. The covering apparatus according to claim 7, wherein the seat structure is a seat structure of a vehicle seat.

9. A seating device,. comprising:

a seat structure comprising a seat shell having a fastening edge and a fastening unit that projects from the seat shell;

a seat upholstery; and a cover, comprising: a covering unit for at least partially spanning the seat structure; and a fastening device, wherein the fastening device is configured to be integrated in the covering unit, wherein the fastening edge of the seat shell is inserted into the fastening device such that the fastening device at least partially encloses the fastening edge, and wherein the fastening device, comprises:

a first leg having a lug at one end of the first leg; and a second leg having a fastening opening into which the fastening unit that projects from the seat shell engages at least partially so that fastening of the cover on the seat shell is fixed in at least six degrees of freedom.

10. The seating device according to claim 9 wherein the seating device is for a vehicle.

11. A vehicle, comprising:

a vehicle seat, comprising:

a seat structure comprising a seat shell having a fastening edge and a fastening unit that projects from the seat shell;

a seat upholstery; and a cover, comprising: a covering unit for at least partially spanning the seat structure; and a fastening device, wherein the fastening device is configured to be integrated in the covering unit, wherein the fastening edge of the seat shell is inserted into the fastening device such that the fastening device at least partially encloses the fastening edge, and wherein the fastening device, comprises:

a first leg having a lug at one end of the first leg; and a second leg having a fastening opening into which the fastening unit that projects from the seat shell engages at least partially so that fastening of the cover on the seat shell is fixed in at least six degrees of freedom.

12. The fastening system according to claim 1, wherein the seat shell further comprises:

a frame opening, wherein the fastening unit is substantially complementary with respect to the frame opening of the seat shell.

* * * * *